June 21, 1949.　　　　　E. G. JOHNSON　　　　　2,473,589
HEATING AND COOLING SYSTEM FOR HORTICULTURAL
HOUSES AND CLOCHES
Filed May 31, 1945　　　　　　　　　　　　　3 Sheets-Sheet 1
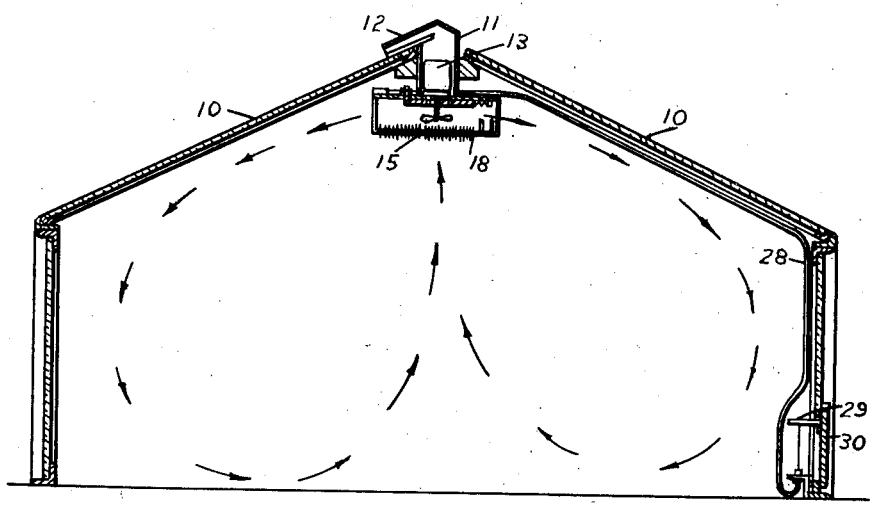
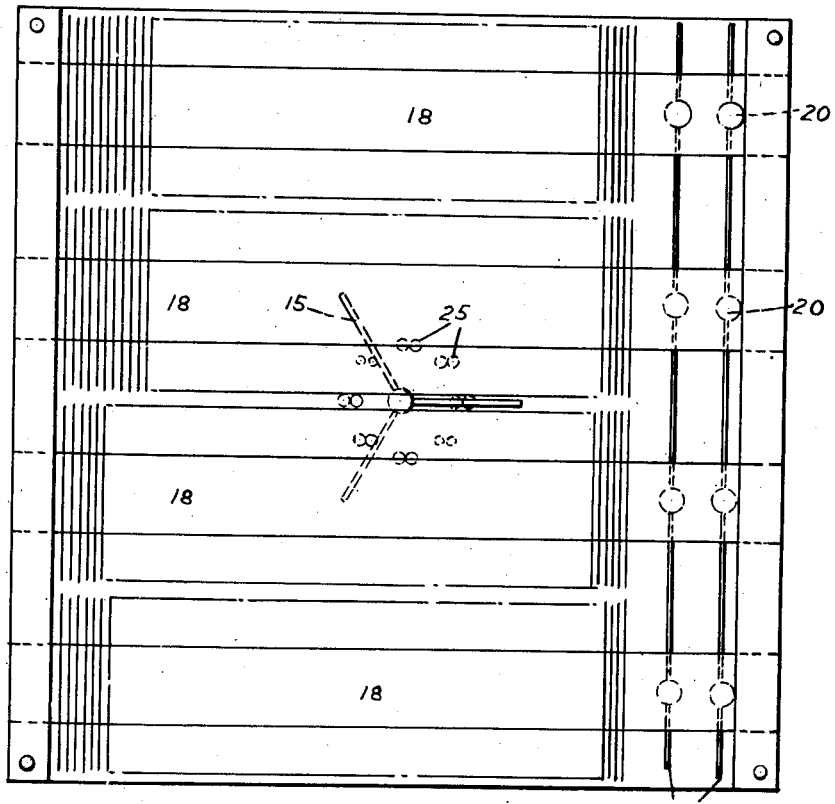
Inventor
ERIC GODDARD JOHNSON
By
Emery Holcombe & Blair
Attorney June 21, 1949.   E. G. JOHNSON   2,473,589
HEATING AND COOLING SYSTEM FOR HORTICULTURAL
HOUSES AND CLOCHES
Filed May 31, 1945   3 Sheets-Sheet 2
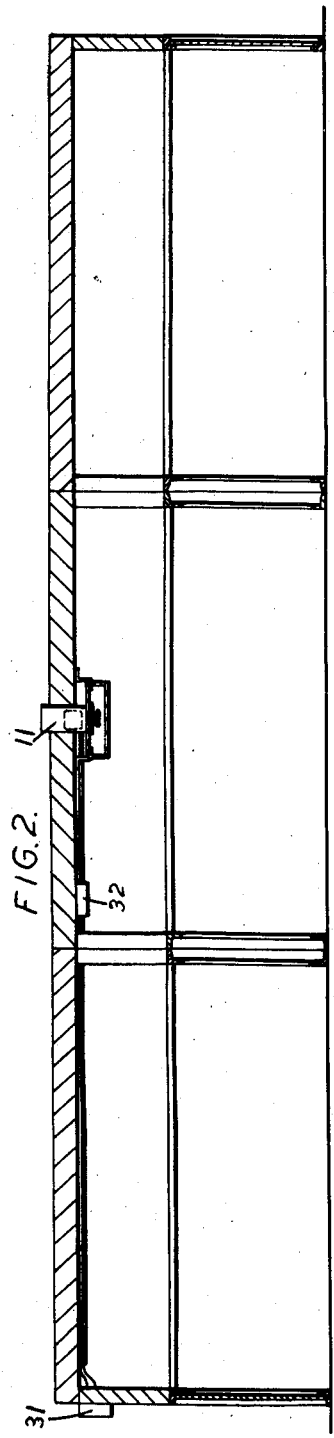
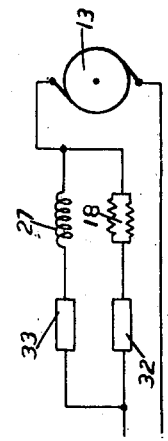
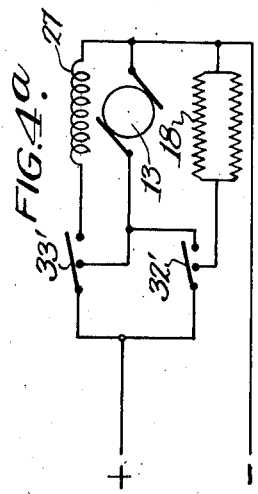
Inventor
ERIC GODDARD JOHNSON
By Emery Holcombe & Blair
Attorney June 21, 1949.                E. G. JOHNSON                 2,473,589
              HEATING AND COOLING SYSTEM FOR HORTICULTURAL
                          HOUSES AND CLOCHES
Filed May 31, 1945                                     3 Sheets-Sheet 3
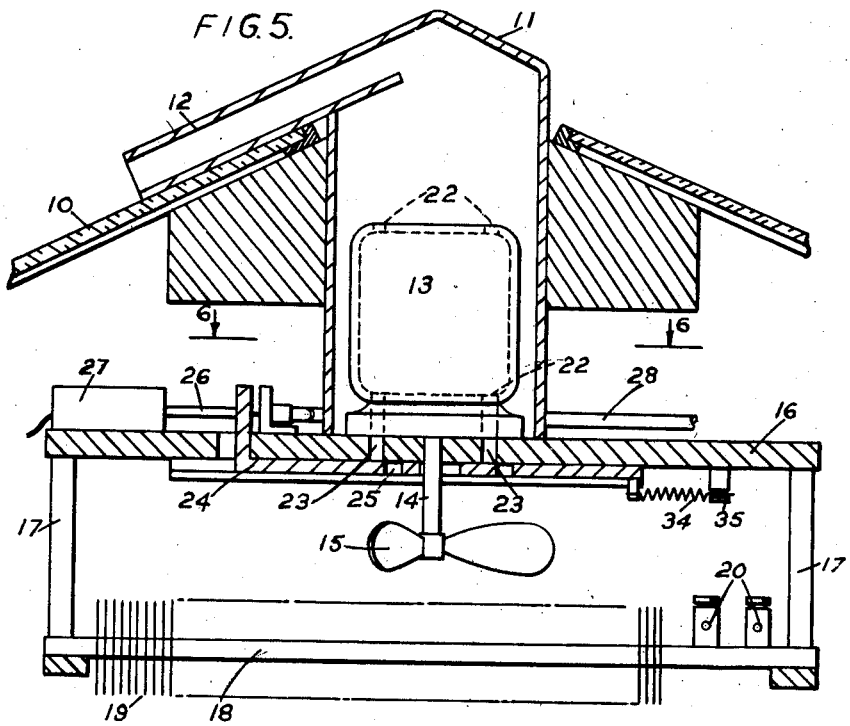
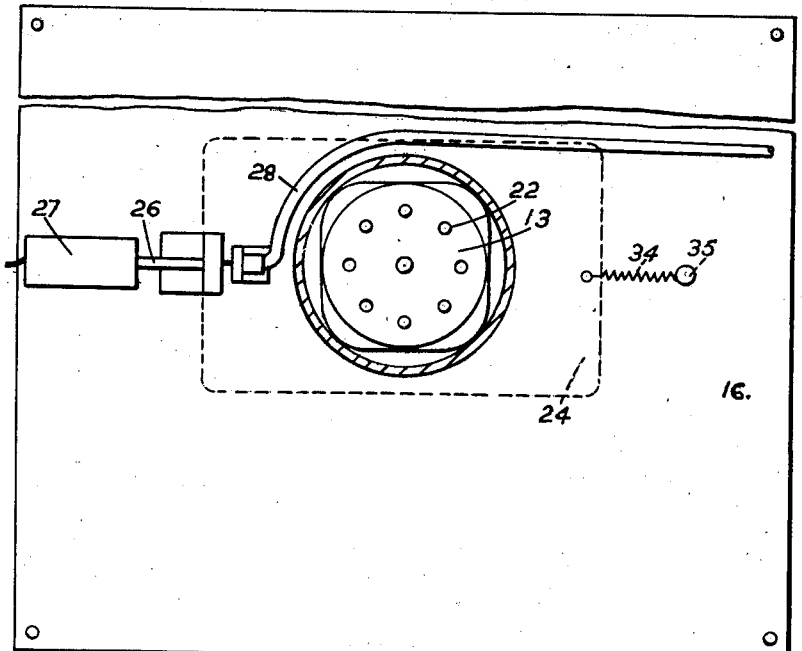
Inventor
ERIC GODDARD JOHNSON
By
Emery Holcombe & Blair
Attorney Patented June 21, 1949

2,473,589

UNITED STATES PATENT OFFICE 2,473,589

HEATING AND COOLING SYSTEM FOR HORTICULTURAL HOUSES AND CLOCHES

Eric Goddard Johnson, Spalding, England

Application May 31, 1945, Serial No. 596,957
In Great Britain June 9, 1944

3 Claims. (Cl. 219—39)

1

This invention relates to a heating and cooling system for horticultural houses and cloches. It has for its principal object to provide a system subject to thermostatic control and employing an air heater in association with a motor driven fan whereby air can be circulated in the enclosure and is either heated or cooled as required. A further object is to provide a convenient system whereby heated air can be circulated so long as the temperature is below a certain level, and external cool air can be circulated when the temperature rises above a higher level, no circulation of air taking place between the two levels of temperature. These and other objects are attained by the means hereinafter described. When heating is necessary a current is applied to electric heater elements over or through which the air flows in reaching the fan. When cooling is required the heating is cut off and apertures are opened which will admit fresh air from outside to the fan so that it will circulate comparatively cool air within the greenhouse, cloche or the like which is to be cooled. Preferably two thermostats are provided, one of which switches on both the heaters and the motor-driven fan when the temperature falls below a safe level, say 65° F., and switches off both the heaters and the motor-driven fan above this level of temperature, while the other thermostat operates at a higher temperature, say 75° F., to open the passage for entry of external air and to switch on the fan when this temperature is exceeded, or to close the passage for external air and switch off the fan when the internal temperature falls below this figure. There may then be an interval such as 10° between the two ranges in which no heating of the air, no circulation by the fan and no admission of external air will be necessary. The two temperature ranges are only indicated approximately by way of example, and it depends of course on the conditions of operation of each greenhouse, cloche or the like what are the actual temperatures at which the two thermostats should be set to operate. Each thermostat also has a certain lag so that with a rising temperature it will operate one way at a higher temperature, and with a falling temperature it will operate the other way at a lower temperature.

The invention is illustrated in the accompanying drawings, in which:

Figure 1 shows a cross-section of a horticultural house such as a cloche, to which the invention is applied;

2

Figure 2 shows on a smaller scale a longitudinal section of such a cloche, consisting of three sections or bays disposed end to end;

Figure 3 is an underneath view of the heater used in Figure 1;

Figures 4 and 4a are equivalent circuit diagrams;

Figure 5 shows a sectional elevation of the heater and circulating system; and

Figure 6 is a plan view of the mechanism shown in section on the lines 6—6 of Figure 5.

It will be assumed that the greenhouse or cloche shown in Figures 1 and 2 is to have the air within it maintained at a temperature not lower than 65° F., and not higher than 75° F. The structure is made substantially airtight so that it will only admit air or allow it to escape when required. The roof 10 of the cloche has fitted approximately centrally therein a casing 11 with a downwardly directed opening at one side as at 12, through which air may be admitted when required. Within the casing 11 is mounted an electric motor 13 having a vertical shaft 14 which extends downwardly and carries fan blades 15 on its lower end. The fan motor is supported on a panel having downwardly extending columns 17 supporting a number of electric resistance heaters 18 each provided with radiating fins 19. Current is supplied to the heater elements through terminals 20. In the example shown in Figure 3 there are four such heater elements with their terminals connected in parallel by electric leads 21.

The electric motor 13 preferably has ventilation apertures as indicated at 22, Figure 6, in its end covers so that air passing through the casing 11 may be drawn in part through the windings of the motor for cooling purposes. Apertures are also formed as at 23 in the panel 16, in register with the holes in the motor casing, and an off and on slide valve 24 is provided with corresponding apertures 25 which can be brought into register with the apertures 23 when a flow of air through the casing 11 to the fan 15 is desired. The slide valve 24 has a lug at one end, projecting upwardly through a slot in the panel 16, adapted to be drawn toward the left in Figures 5 and 6 by a rod 26 connected to the core of a solenoid 27. The rod 26 is also connected through a cable enclosed in a sheath 28 to the operating member 29 of a sliding ventilator 30, Figure 1, near the bottom of the cloche at one side, this ventilator being opened when the slide valve 24 is drawn to the left to bring the apertures 25 into register with the apertures 23 and being closed when the slide valve 24 is obstructing the apertures 23. The provision of the ventilator 30 is not essential if there is space for some leakage of air around the bottom of the cloche, for example, but is is indicated here in order to show the complete ventilating system.

The electric supply connection is made to the cloche through a terminal box as at 31, Figure 2, generally near one end, and the circuit connections include two thermostatic switches 32 and 33 and 32' and 33' connected in parallel to the supply, as indicated diagrammatically in Figures 4 and 4a. The thermostatic switch 32 may be of any convenient type, for example, a heavy duty thermostat or a thermostatically controlled relay, and is adjusted to close its circuit whenever the temperature falls below 65° F. It then supplies current to the electric heaters 18 and through these in series to the motor 13 driving the fan 15 as shown in Figure 4, or in parallel circuit arrangement as in Figure 4a. Under these conditions air is circulated outwardly by the fan, as indicated diagrammatically by the arrows in Figure 1, returning up the centre of the cloche over and between the electric heaters 18, to reach the fan again. The ventilator 30 is closed under these conditions and the slide valve 24 is closed as in Figure 5, being drawn to the right in that figure by a spring 34 connected to a post 35. When the temperature rises above 65° F., or thereabouts the thermostatic switch 32 breaks the circuit of the electric heater 18 and of the electric motor 13.

If the temperature rises above 75° F., the other thermostatic switch 33 closes its circuit, which includes the solenoid 27 and the electric motor 13. The solenoid 27 causes the slide valve 24 to be pulled toward the left until the apertures at 25 register with the apertures 23 in the panel 16 and now the fan 15 creates a condition of reduced pressure in the neighbourhood of the apertures 25 which causes fresh air from outside to be drawn in through the opening 12 in the casing 11, through the apertures 22, 23 and 25 to the fan 15, whence the air is distributed within the cloche. An amount of air corresponding with that drawn in at the top escapes through the ventilator 30, which is opened simultaneously with the slide valve 24.

The slide valve 24 may have other apertures in it registering with additional apertures in the panel to admit air passing through the casing 11, around the motor 13, and the arrangement illustrated in which the incoming air helps to cool the electric motor, is only given by way of example.

When the temperature falls sufficiently below 75° F. the thermostatic switch 33 opens its circuit, cutting out the solenoid 27 and the electric motor 13. The fan 15 therefore stops and the slide valve 24 closes as the air within the cloche 10 is now within the desired temperature range. Nothing further happens in the heating and ventilating mechanism so long as the temperature remains between 65° F. and 75° F., but if it falls below this range the motor 13 and heaters 18 are brought into action, and if it rises above this range the motor 13 and the solenoid 27 are brought into action to admit fresh air from outside.

The precise arrangement hereinbefore described may of course be modified, as the motor 13 is not necessarily placed in the casing 11 through which air may enter although it is convenient so to place it because the entering air then helps to cool the motor. The fan 15 may be arranged in any convenient way to draw in air which passes over the heaters 18 and to distribute this air laterally under the top lights and down the side walls of the enclosure 10. The mechanism is not necessarily placed in the middle of the roof of the enclosure although it is generally most convenient to place it there where it will not restrict the free space for growing plants within the enclosure.

I claim:

1. A combined heating and cooling system for the air in a horticultural enclosure, comprising a panel and means for supporting the same in the upper part of such an enclosure, a casing above said panel adapted to project to form an air intake, an electric motor on said panel, a fan on the shaft of said motor, an electric heater, means for supplying electric current to said motor and said heater, and thermostatic controlling means having electrical contacts for completing an electrical circuit including said motor and heater, said thermostatic controlling means normally maintaining said circuit open and adapted to switch both said heater and said motor into circuit when the temperature in said enclosure falls below a predetermined lower level, a valve and electro-magnetic means for operating the same for controlling the entry of external air through said casing, and a second thermostatic controlling means having electrical contacts for completing an electrical circuit including said motor and electro-magnetic means, said second controlling means normally maintaining said circuit open and adapted to operate to close the circuit of said motor and said electro-magnetic valve controlling means, when the temperature in said enclosure exceeds a certain higher level, whereby, when the temperature in said enclosure falls below said predetermined lower level, said heater and said fan are operated to circulate warmed air, and, when the temperature in said enclosure exceeds said higher level, the fan is operated to circulate air from outside within said enclosure.

2. A combined heating and cooling system for the air in a horticultural enclosure, comprising a panel and means for supporting the same in the upper part of such an enclosure, a casing extending upwardly from said panel, and means for admitting external air to said casing, an on-and-off valve for controlling the passage of external air through said casing, a solenoid adapted to operate said valve to open the same, and a spring adapted normally to close said valve, an electric motor and a fan on the shaft of said motor beneath said panel, an electric heater with means for supporting the same beneath said fan, two thermostats having electrical contacts forming parts of electrical circuits, the one adapted to close a circuit including said motor and said electric heater when the temperature within said enclosure falls below a lower level, and the other adapted to close the circuit of said solenoid and said motor when the temperature in said enclosure rises above a higher level, and means for supplying electric current to said thermostats and the circuits controlled thereby.

3. The combination with a horticultural enclosure having a ridged roof, of a panel and means for supporting it in said enclosure beneath the ridge of said roof, a casing extending upwardly from said panel through the ridge of said roof, and means for admitting external air to said casing above the ridge of said roof, an on-and-off valve adapted to control the entry of air through said casing to said enclosure, electro-magnetic means for operating said valve, an electric motor and a fan driven thereby, an electrical circuit including said electro-magnetic means and motor, said fan disposed beneath said panel, an electric heater beneath said fan, an electrical circuit including said heater and motor, and two thermostatic controls having electrical contacts forming parts of said electrical circuits respectively, one adapted to close the circuit of said motor and said electric heater so long as the temperature within said enclosure is below a certain level, and the other adapted to close the circuit of said electro-magnetic control means and said motor when the temperature within said enclosure is above a higher level, said circuits including means for supplying electric current and normally being open.

ERIC GODDARD JOHNSON.

REFERENCES CITED

The following references are of record in the file of this patent:

UNITED STATES PATENTS

| Number | Name | Date |
|---|---|---|
| 631,555 | Billings | Aug. 22, 1899 |
| 1,000,366 | Booraem | Aug. 15, 1911 |
| 2,058,252 | Parsons | Oct. 20, 1936 |
| 2,195,954 | Fields | Apr. 2, 1940 |
| 2,351,096 | Blue | June 13, 1944 |
| 2,354,292 | Waterman | July 25, 1944 |